US012489305B2

(12) United States Patent
Vishal

(10) Patent No.: US 12,489,305 B2
(45) Date of Patent: Dec. 2, 2025

(54) CHARGER ASSEMBLY FOR CHARGING AN ENERGY STORAGE UNIT ASSOCIATED WITH AN ELEVATOR

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 0 days.

(21) Appl. No.: 18/292,050

(22) PCT Filed: Dec. 12, 2023

(86) PCT No.: PCT/IB2023/062526
§ 371 (c)(1),
(2) Date: Jan. 25, 2024

(87) PCT Pub. No.: WO2024/165912
PCT Pub. Date: Aug. 15, 2024

(65) Prior Publication Data
US 2025/0364820 A1    Nov. 27, 2025

(30) Foreign Application Priority Data
Feb. 8, 2023  (IN) .............................. 202341008144

(51) Int. Cl.
*B66B 1/00* (2006.01)
*B66B 7/00* (2006.01)
(Continued)

(52) U.S. Cl.
CPC .............. *H02J 7/0042* (2013.01); *B66B 7/00* (2013.01); *B66B 11/0226* (2013.01); *B66B 9/04* (2013.01)

(58) Field of Classification Search
CPC ....... H02J 7/0042; B66B 9/04; B66B 11/0226
See application file for complete search history.

(56) References Cited

U.S. PATENT DOCUMENTS 2,927,661 A * 3/1960 Kristek ...................... B66B 9/04
187/360
3,949,953 A * 4/1976 Hopkins ................ B65G 51/06
406/185
(Continued)

FOREIGN PATENT DOCUMENTS

CN         102295204 A    12/2011
CN         203938300 U    11/2014
(Continued)

*Primary Examiner* — Michael A Riegelman
(74) *Attorney, Agent, or Firm* — Jason C. Cameron

(57) ABSTRACT

A charger assembly 10 for charging an energy storage unit associated with an elevator is provided. The charger assembly includes a first charger unit 20 mechanically coupled to an elevator column 30. The first charger unit is adapted to tap voltage from a power source. The first charger unit interconnects a first block 40 and a second block 50. The first block includes at least two slots 60 adapted to interlock with at least two projections 70 provided on the second block. The charger assembly also includes a second charger unit 80 electrically coupled with the first charger unit and mounted on a guide bracket 90 associated with a cabin of the elevator. The second charger unit includes a plurality of pins 100 adapted to receive the voltage tapped by the first charger unit to charge the energy storage unit associated with the elevator.

11 Claims, 7 Drawing Sheets

(51) Int. Cl.
*B66B 11/02* (2006.01)
*H02J 7/00* (2006.01)
*B66B 9/04* (2006.01)

(56) References Cited

U.S. PATENT DOCUMENTS

| | | | | |
|---|---|---|---|---|
| 5,617,003 | A * | 4/1997 | Odachi | B60L 53/35 |
| | | | | 320/108 |
| 6,408,986 | B1 * | 6/2002 | Ayano | B66B 1/461 |
| | | | | 187/290 |
| 10,233,055 | B1 * | 3/2019 | Ascua | B66B 11/026 |
| 11,814,267 | B2 * | 11/2023 | Babu | B66B 11/0226 |
| 2016/0013682 | A1 * | 1/2016 | Ostendorf | H02J 50/60 |
| | | | | 320/108 |
| 2023/0126885 | A1 * | 4/2023 | Babu | B66B 7/026 |
| | | | | 187/408 |
| 2023/0192444 | A1 * | 6/2023 | Babu | B66B 9/04 |
| 2023/0202800 | A1 * | 6/2023 | Babu | B66B 7/022 |
| | | | | 187/406 |
| 2024/0300779 | A1 * | 9/2024 | Babu | B66B 7/022 |

FOREIGN PATENT DOCUMENTS

| | | | | |
|---|---|---|---|---|
| CN | 109455605 A | * | 3/2019 | B66B 11/04 |
| JP | 2002003096 A | | 1/2002 | |
| WO | WO-2021245455 A1 | * | 12/2021 | B66B 7/02 |
| WO | WO-2024161202 A1 | * | 8/2024 | B66B 11/0266 |
| WO | WO-2024165912 A1 | * | 8/2024 | B66B 7/00 |

* cited by examiner

CHARGER ASSEMBLY FOR CHARGING AN ENERGY STORAGE UNIT ASSOCIATED WITH AN ELEVATOR

CROSS-REFERENCE TO RELATED APPLICATION

This application claims priority from a Complete Patent application filed in India having Patent Application No. 202341008144, filed on Feb. 8, 2023, and titled "A CHARGER ASSEMBLY FOR CHARGING AN ENERGY STORAGE UNIT ASSOCIATED WITH AN ELEVATOR" and a PCT Application No. PCT/IB2023/062526 filed on Dec. 12, 2023, and titled "A CHARGER ASSEMBLY FOR CHARGING AN ENERGY STORAGE UNIT ASSOCIATED WITH AN ELEVATOR."

FIELD OF INVENTION

Embodiments of the present disclosure relate to a field of elevators and more particularly to a charger assembly for charging an energy storage unit associated with an elevator.

BACKGROUND

An elevator is a machine that transports people and freight between different levels of a structure. The structure may include a building, a maritime vessel and the like. The elevator may include a number of components, such as a cabin, cables, and a motor. The cabin may be used for transporting the people and the freight in an enclosed manner. The motor may be coupled to the cabin via the cables to move the cabin through a hoist way. The cabin may be equipped with various electrical devices such as lights, fans, and control panels. An energy storage unit may be associated with the cabin to power the electrical devices when power source fails.

Currently, the energy storage unit is charged by tapping power from the power source through cables. The power source may be located on top of the elevator. The cables may have to run through an entire elevation of the elevator to supply power to the energy storage unit located inside the elevator cabin from the power source, thereby increasing weight of the elevator cabin and an associated cost. Further, the cables may hamper aesthetics of the elevator when viewed from an external environment. Furthermore, the cables may get stuck with the elevator cabin and may get damaged due to weight of the elevator cabin, since the cables are being introduced into the elevator cabin through a bottom portion of the elevator cabin. Damages to the cables may affect functionality of the elevator. Apart from that, transmission losses may also increase at part with the length of the cables, thereby affecting charging efficiency.

Hence, there is a need for an improved charger assembly for charging an energy storage unit associated with an elevator to address the aforementioned issue(s).

BRIEF DESCRIPTION

In accordance with an embodiment of the present disclosure, a charger assembly for charging an energy storage unit associated with an elevator is provided. The charger assembly includes a first charger unit mechanically coupled to an elevator column. The first charger unit is adapted to tap voltage from a power source. The first charger unit interconnects a first block and a second block. The first block includes at least two slots adapted to interlock with at least two projections provided on the second block. The charger assembly also includes a second charger unit electrically coupled with the first charger unit and mounted on a guide bracket associated with a cabin of the elevator. The second charger unit includes a plurality of pins adapted to receive the voltage tapped by the first charger unit to charge the energy storage unit associated with the elevator.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
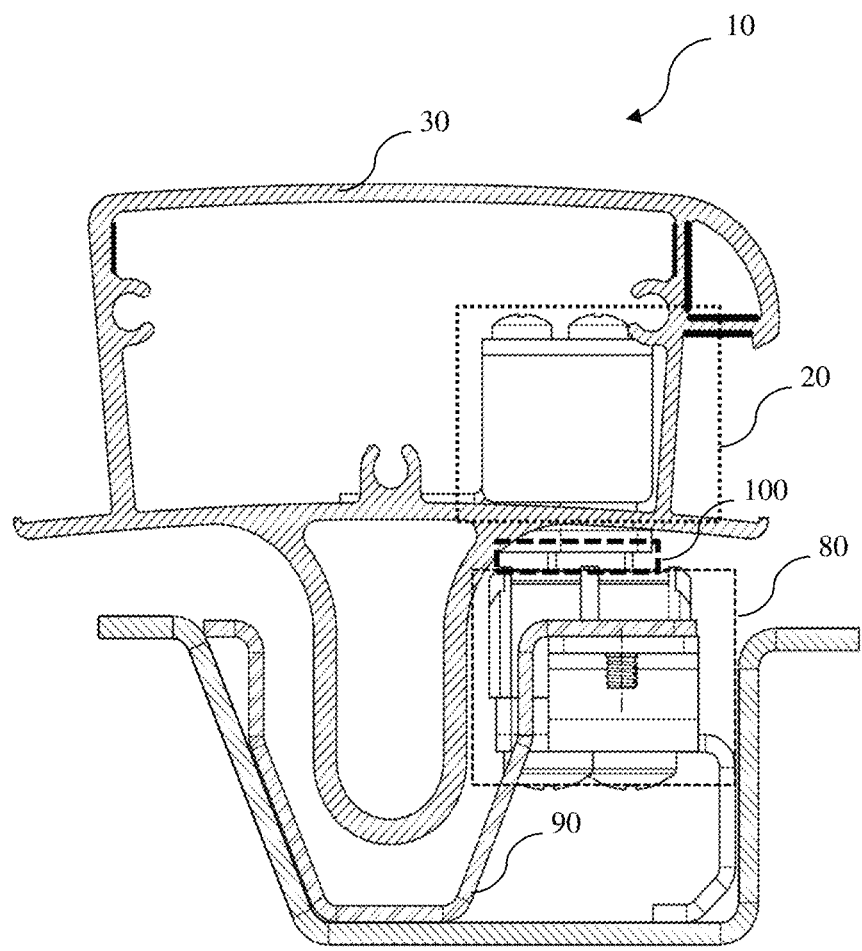
FIG. 1 is a schematic representation of a charger assembly for charging an energy storage unit associated with an elevator in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended.

Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a charger assembly for charging an energy storage unit associated with an elevator. The charger assembly includes a first charger unit mechanically coupled to an elevator column. The first charger unit is adapted to tap voltage from a power source. The first charger unit interconnects a first block and a second block. The first block includes at least two slots adapted to interlock with at least two projections provided on the second block. The charger assembly also includes a second charger unit electrically coupled with the first charger unit and mounted on a guide bracket associated with a cabin of the elevator. The second charger unit includes a plurality of pins adapted to receive the voltage tapped by the first charger unit to charge the energy storage unit associated with the elevator.

FIG. 1 is a schematic representation of a charger assembly 10 for charging an energy storage unit associated with an elevator in accordance with an embodiment of the present disclosure. The charger assembly 10 includes a first charger unit 20 mechanically coupled to an elevator column 30. The first charger unit 20 is adapted to tap voltage from a power source. The charger assembly 10 also includes a second charger unit 80 electrically coupled with the first charger unit 20 and mounted on a guide bracket 90 associated with a cabin of the elevator (not shown in FIG. 1). The second charger unit 80 includes a plurality of pins 100 adapted to receive the voltage tapped by the first charger unit 20 to charge the energy storage unit (not shown in FIG. 1) associated with the elevator.

Further, in some embodiments, the energy storage unit may include, but not limited to, a battery, a super capacitor and the like. In one embodiment, the first charger unit 20 and the second charger unit 80 may include a corresponding converter (not shown in FIG. 1) adapted to alter magnitude of the voltage. In one embodiment, the corresponding converter may include, but not limited to, a transformer, a voltage doubler, a volage multiplier and the like. In some embodiments, the converter may include, a buck converter, a boost converter, a buck boost converter, and the like. In a specific embodiment, the converter may include an inverter. In one embodiment, the voltage may include an alternating current (AC) voltage. In a specific embodiment, the voltage may include a direct current (DC) voltage.

In one embodiment, the plurality of pins 100 may be adapted to receive the voltage tapped by the first charger unit 20, when the plurality of pins 100 are in contact with one or more predefined locations on the first charger unit 20. In one embodiment, the one or more predefined locations may include, power outlets, connectors, conductor rails and the like. In some embodiments, the plurality of pins 100 may be adapted to receive the voltage tapped by the first charger unit 20, when the plurality of pins 100 are at a predefined distance from the first charger unit 20. Detailed diagram of the first charger unit 20 is shown in FIG. 2.

Figure 2:
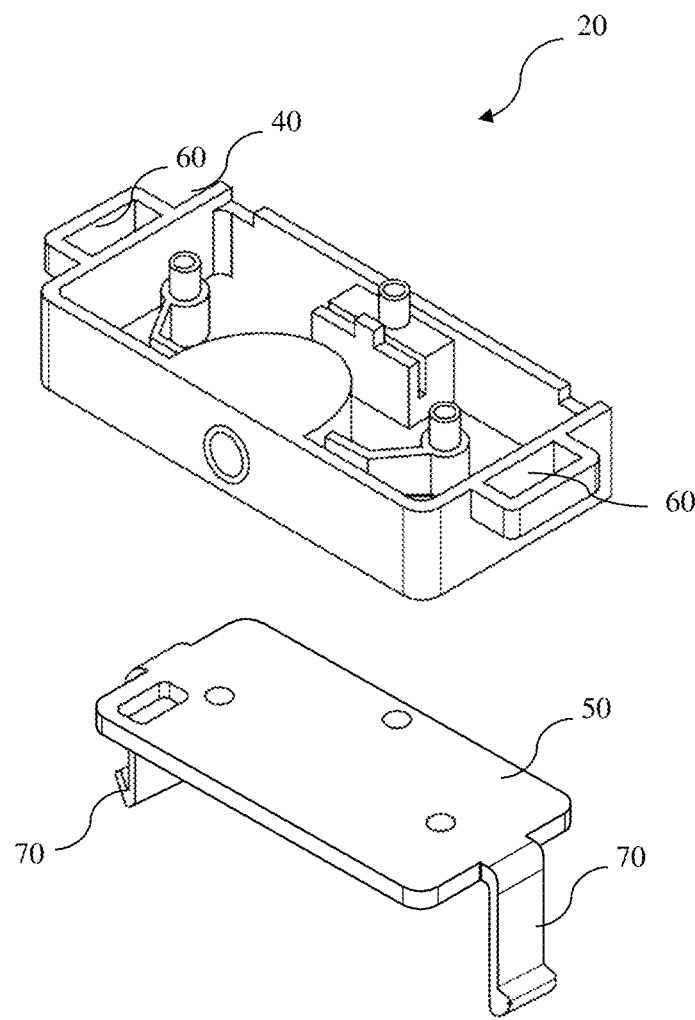
FIG. 2 is a schematic representation of one embodiment of the charger assembly of FIG. 1, depicting detailed diagram of a first charger unit in accordance with an embodiment of the present disclosure.

FIG. 2 is a schematic representation of one embodiment of the charger assembly 10 of FIG. 1, depicting detailed diagram of the first charger unit 20 in accordance with an embodiment of the present disclosure. The first charger unit 20 interconnects a first block 40 and a second block 50. The first block 40 includes at least two slots 60 adapted to interlock with at least two projections 70 provided on the second block 50. In one embodiment, the first block 40 and the second block 50 may be composed of a material including at least one of a poly vinyl chloride, fiber, and metal. Detailed diagram of the second charger unit 80 is shown in FIG. 3.

Figure 3:
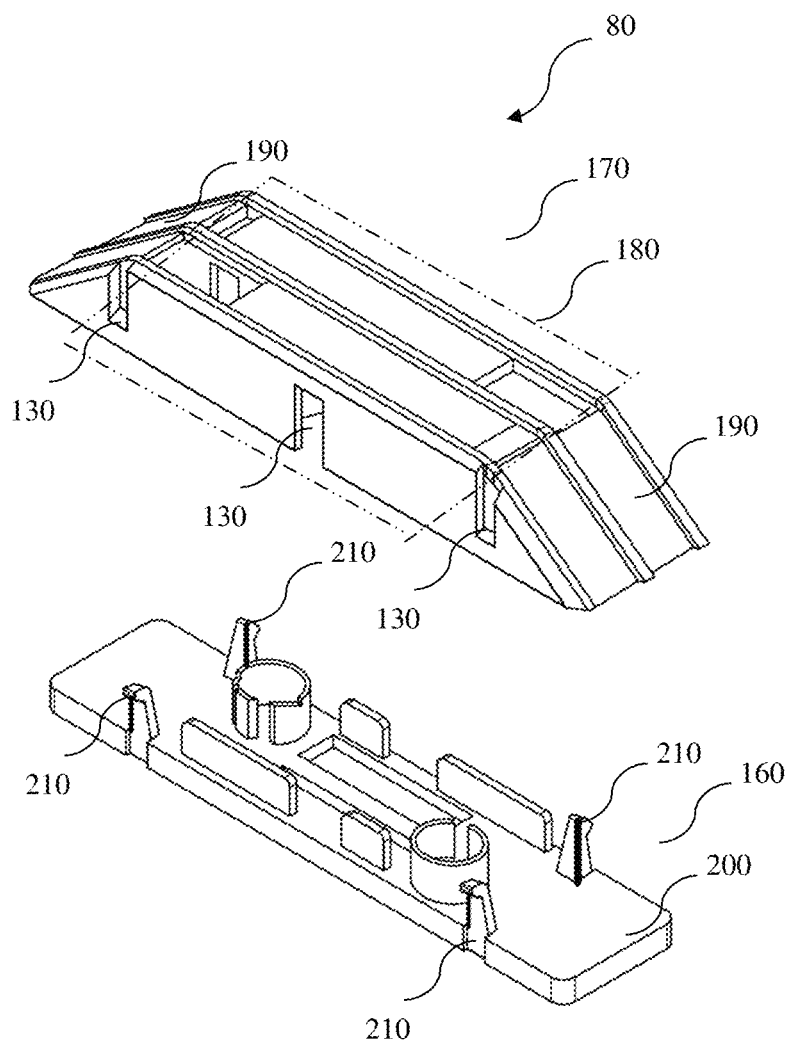
FIG. 3 is a schematic representation of one embodiment of the charger assembly of FIG. 1, depicting detailed diagram of a second charger unit in accordance with an embodiment of the present disclosure.

FIG. 3 is a schematic representation of one embodiment of the charger assembly 10 of FIG. 1, depicting detailed diagram of the second charger unit 80 in accordance with an embodiment of the present disclosure. In one embodiment, the second charger unit 80 may be interconnecting a base plate 160 and a top plate 170. In such an embodiment, the top plate 170 may include a first rectangular structure 180 connected to at least two slanted surfaces 190 of the top plate 170. In one embodiment, the base plate 160 may include a second rectangular structure 200 including a plurality of projections 210. In such an embodiment, the top plate 170 may include a plurality of holes 130 adapted to interlock with the plurality of projections 210 of the base plate 160 to couple the base plate 160 and the top plate 170. In one embodiment, the base plate 160 and the top plate 170 may be composed of a material including at least one of the poly vinyl chloride, the fiber, and the metal. Operational arrangement of the second charger unit 80 on the guide bracket 90 is shown in FIG. 4.

Figure 4:
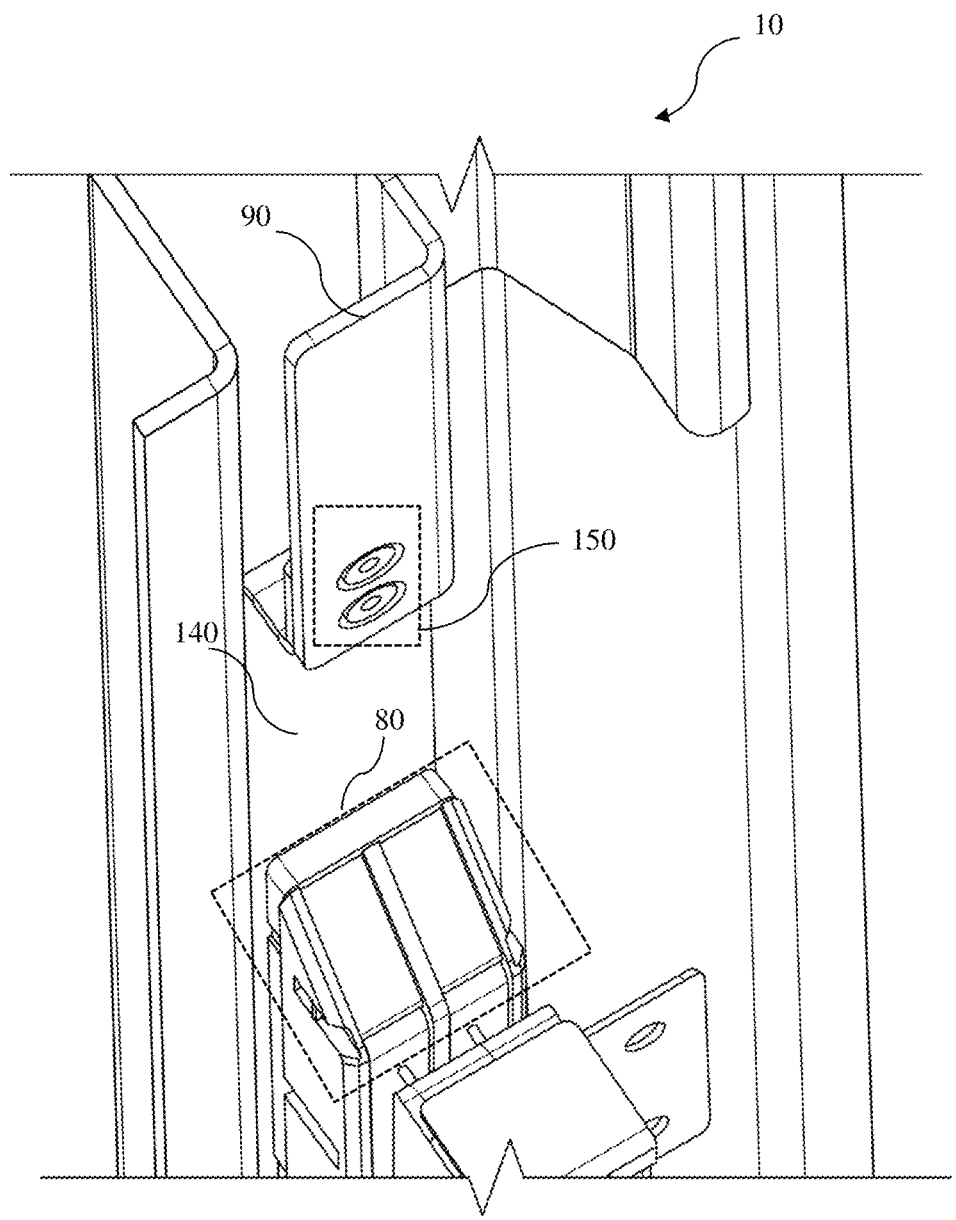
FIG. 4 is a schematic representation of one embodiment of the charger assembly of FIG. 1, depicting operational arrangement of the second charger unit and a guide bracket in accordance with an embodiment of the present disclosure.

FIG. 4 is a schematic representation of one embodiment of the charger assembly 10 of FIG. 1, depicting operational arrangement of the second charger unit 80 on the guide bracket 90 in accordance with an embodiment of the present disclosure. In one embodiment, the second charger unit 80 is mounted on the guide bracket 90 through a rectangular plate 140 coupled to the guide bracket 90 through a plurality of fasteners 150. Operational arrangement of the first charger unit 20 on the elevator column 30 is shown in FIG. 5.

Figure 5:
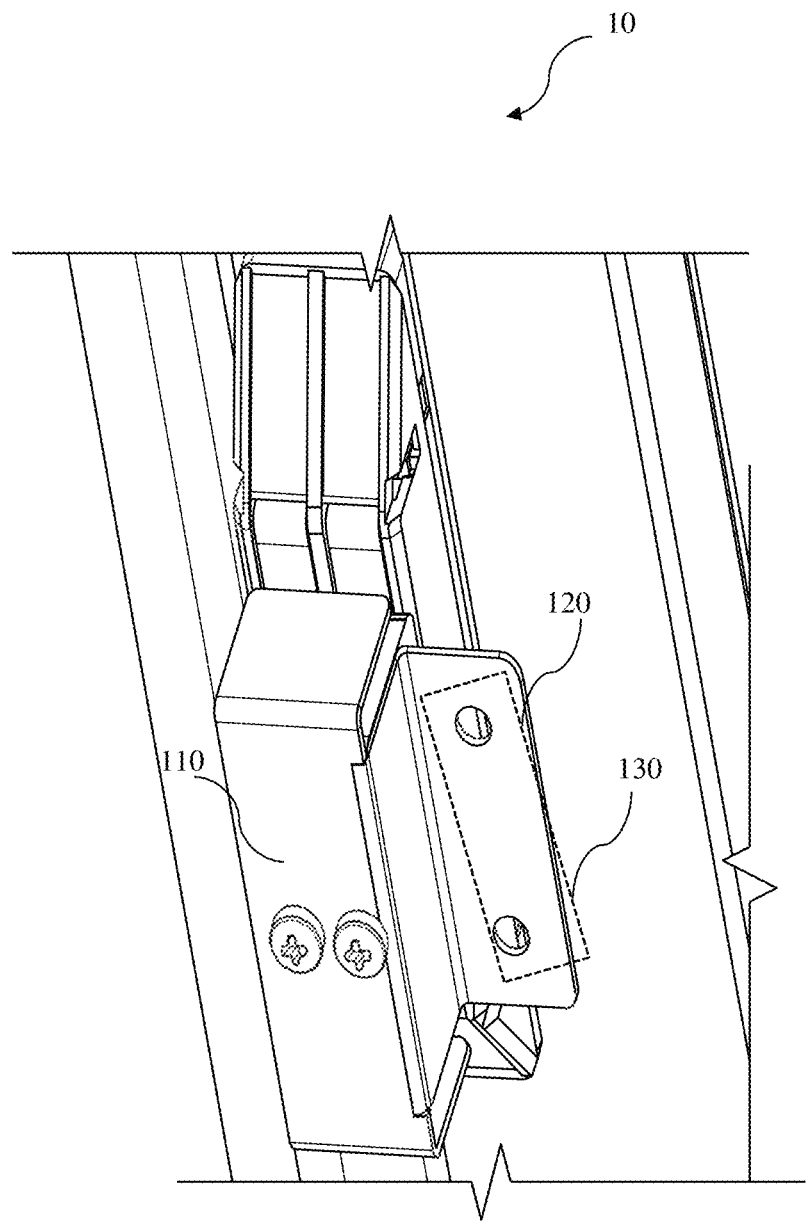
FIG. 5 is a schematic representation of one embodiment of the charger assembly of FIG. 1, depicting operational arrangement of the first charger unit and an elevator column in accordance with an embodiment of the present disclosure.
Figure 6:
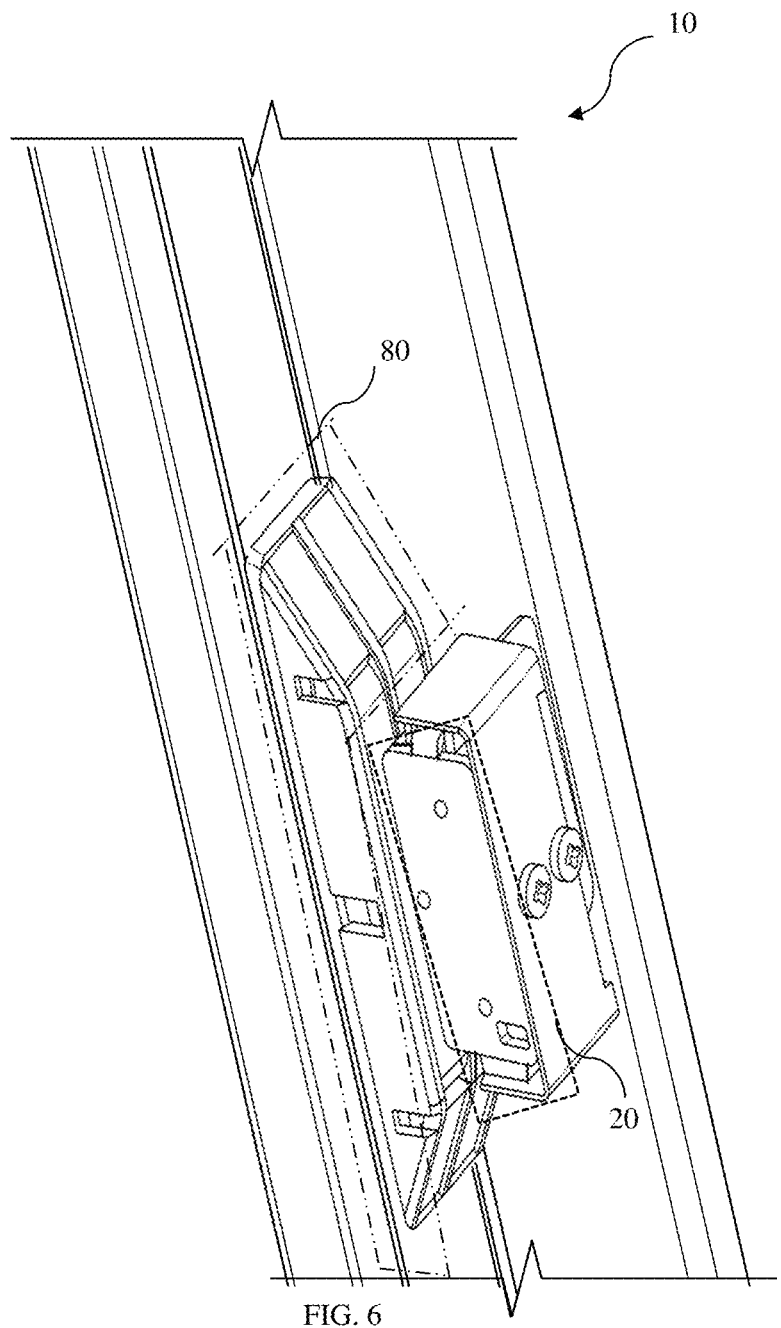
FIG. 6 is a schematic representation of one embodiment of the charger assembly of FIG. 1, depicting isometric view of the first charging unit and the second charging unit in accordance with an embodiment of the present disclosure.

FIG. 5 is a schematic representation of one embodiment of the charger assembly 10 of FIG. 1, depicting operational arrangement of the first charger unit 20 on the elevator column 30 in accordance with an embodiment of the present disclosure. In one embodiment, the first charger unit 20 may be mounted on the elevator column 30 via a 'C' shaped plate 110. In such an embodiment, the 'C' shaped plate 110 may include an 'L' shaped bracket 120 including a plurality of holes 130. In one embodiment, the plurality of holes 130 may be used to fix the 'L' shaped bracket 120 with elevator column 30. An isometric view of the first charger unit 20 and the second charger unit 80 is shown in FIG. 6.

Figure 7:
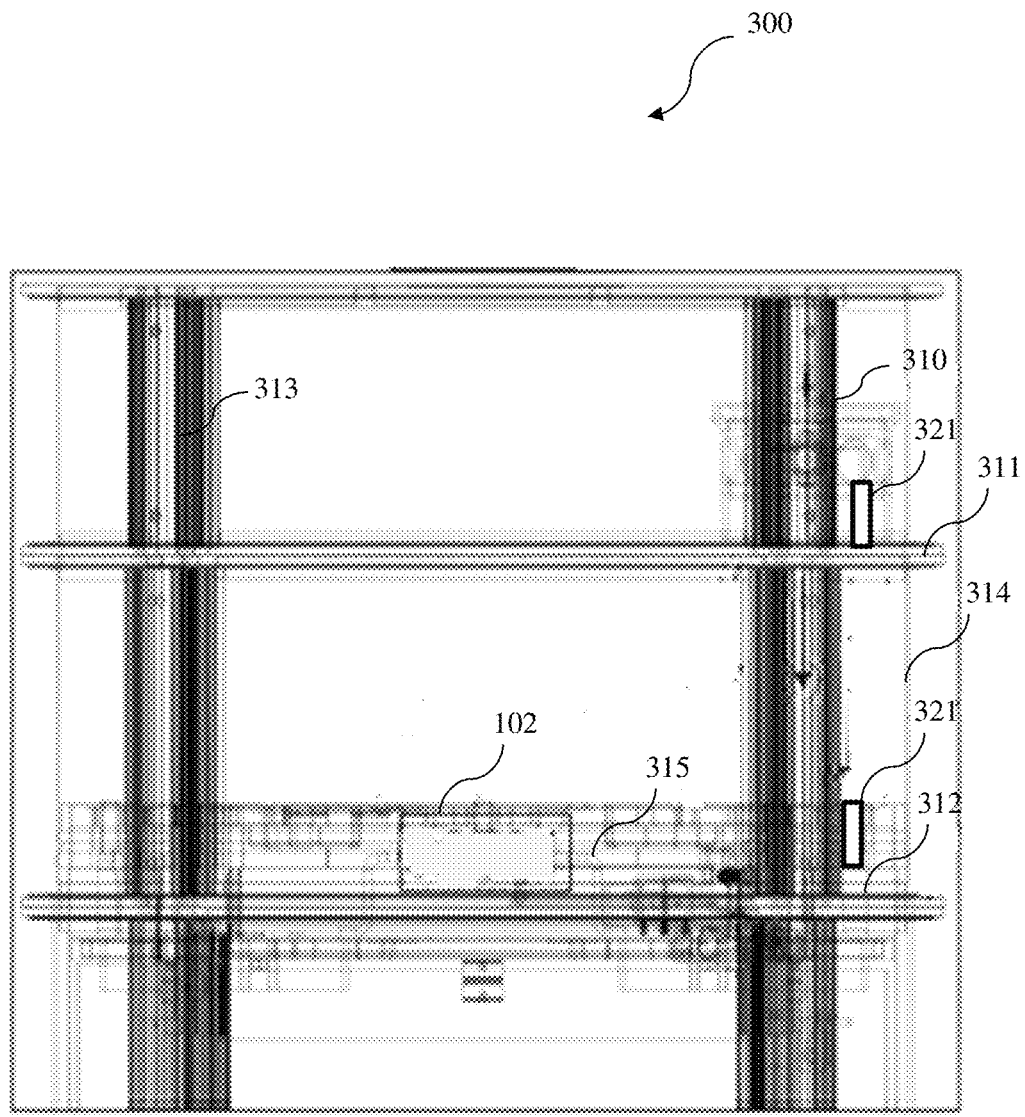
FIG. 7 is a schematic representation of a pneumatic vacuum elevator in accordance with an embodiment of the present disclosure.

FIG. 7 is a schematic representation of a pneumatic vacuum elevator 300 in accordance with an embodiment of the present disclosure. The pneumatic vacuum elevator 300 includes an external cylinder assembly 310 including an elevator cabin 102 inserted therein. The external cylinder assembly 310 includes a plurality of cylinders coupled using a base ring assembly 311 and a band ring assembly 312. The pneumatic vacuum elevator 300 also includes a guide rail pillar 313 and a polycarbonate sheet 314. The guide rail pillar 313 is mechanically coupled to the elevator cabin 102.

Moreover, the guide rail pillar 313 is disposed at the external cylinder assembly 310, wherein the guide rail pillar 313 is configured to guide an actuation of the elevator cabin 102. The polycarbonate sheet 314 is configured to cover the external cylinder assembly 310, wherein the polycarbonate sheet 314 and the external cylinder assembly 310 is coupled using a first locking device and a second locking device. The first locking device is configured to lock an air gap between the polycarbonate sheet 314, the base ring assembly 311 and the external cylinder assembly 310 and the second locking device is configured to lock air gap between the polycarbonate sheet 314 and the guide rail pillar 313.

Further, the pneumatic vacuum elevator 300 includes a seal assembly 315 adapted to fit over a top portion of the elevator cabin 102. The seal assembly 315 is configured to seal the elevator cabin 102 to reduce vibrations during upward and downward movement of the elevator cabin 102. The seal assembly 315 includes a depressurizing system configured to prevent the elevator cabin 102 from coming into force contact with the external cylinder assembly during upward movement and contribute to safety of an elevator 300 operation.

Furthermore, the pneumatic vacuum elevator 300 also includes a first charger unit 20 mechanically coupled to an elevator column 30. The first charger unit 20 is adapted to tap voltage from a power source. The first charger unit 20 interconnects a first block 40 and a second block 50. The first block 40 includes at least two slots 60 adapted to interlock with at least two projections 70 provided on the second block 50. The pneumatic vacuum elevator 300 further includes a second charger unit 80 electrically coupled with the first charger unit 20 and mounted on a guide bracket 90 associated with a cabin of the elevator. The second charger unit 80 includes a plurality of pins 100 adapted to receive the voltage tapped by the first charger unit 20 to charge the energy storage unit associated with the elevator.

Various embodiments of the charger assembly for charging an energy storage unit associated with an elevator described above enable various advantages. Provision of the first charger unit and the second charger units provides a way for charging the energy storage unit associated with the elevator by circumventing the need of the cables thereby reducing weight of the elevator cabin. Reduction in weight of the elevator cabin further reduces cost associated with the motor and the cost of extending the hoist way. By avoiding the cables, the charger assembly is capable of eliminating the transmission losses, thereby increasing the charging efficiency. The first charging unit and the second charging unit is also capable of transferring the power wirelessly thereby increasing maneuverability of the cabin through the hoist way. Also, the charger assembly is capable of eliminating the issues that may have arised due to damaging of the cables. Additionally, the charger assembly is capable of providing an aesthetic appeal to the elevator by eliminating the cables. The first charger unit and the second charger unit is capable of charging the energy storage unit associated with the elevator cabin, when the elevator cabin lands at each floor level, thereby maintaining the energy storage unit at optimum charge during the operational hours of the elevator.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A charger assembly 10 for charging an energy storage unit associated with an elevator, wherein the charger assembly 10 comprising:
   a first charger unit 20 mechanically coupled to an elevator column 30, wherein the first charger unit 20 is adapted to tap voltage from a power source, wherein the first charger unit 20 is interconnecting a first block 40 and a second block 50, wherein the first block 40 comprises at least two slots 60 adapted to interlock with at least two projections 70 provided on the second block 50; and
   a second charger unit 80 electrically coupled with the first charger unit 20 and mounted on a guide bracket 90 associated with a cabin of the elevator, wherein the second charger unit 80 comprises a plurality of pins 100 adapted to receive the voltage tapped by the first charger unit 20 to charge the energy storage unit associated with the elevator.

2. The charger assembly 10 as claimed in claim 1, wherein the first charger unit 20 is mounted on the elevator column 30 via a 'C' shaped plate 110, wherein the 'C' shaped plate 110 comprise an 'L' shaped bracket 120 comprising a plurality of holes 130.

3. The charger assembly 10 as claimed in claim 1, wherein the second charger unit 80 is mounted on the guide bracket 90 through a rectangular plate 140 coupled to the guide bracket 90 through a plurality of fasteners 150.

4. The charger assembly 10 as claimed in claim 1, wherein the second charger unit 80 is interconnecting a base plate 160 and a top plate 170, wherein the top plate 170 comprises a first rectangular structure 180 connected to at least two slanted surfaces 190 of the top plate 170, wherein the base plate 160 comprises a second rectangular structure 200 comprising a plurality of projections 210.

5. The charger assembly 10 as claimed in claim 4, wherein the top plate 170 comprises a plurality of holes 130 adapted to interlock with the plurality of projections 210 of the base plate 160 to couple the base plate 160 and the top plate 170.

6. The charger assembly 10 as claimed in claim 1, wherein the first charger unit 20 and the second charger 80 unit comprises a corresponding converter adapted to alter magnitude of the voltage.

7. The charger assembly 10 as claimed in claim 1, wherein the voltage comprises an alternating current (AC) voltage.

8. The charger assembly 10 as claimed in claim 1, wherein the voltage comprises a direct current (DC) voltage.

9. The charger assembly 10 as claimed in claim 1, wherein the plurality of pins 100 are adapted to receive the voltage tapped by the first charger unit 20, when the plurality of pins 100 are in contact with one or more predefined locations on the first charger unit 20.

10. The charger assembly 10 as claimed in claim 1, wherein the plurality of pins 100 are adapted to receive the voltage tapped by the first charger unit 20, when the plurality of pins 100 are at a predefined distance from the first charger unit 20.

11. A pneumatic vacuum elevator 300 comprising:
- an external cylinder assembly 310 comprising an elevator cabin 102 inserted therein, wherein the external cylinder assembly 310 comprises a plurality of cylinders coupled using a base ring assembly 311 and a band ring assembly 312;
- a guide rail pillar 313 mechanically coupled to the elevator cabin 102, wherein the guide rail pillar 313 is disposed at the external cylinder assembly 310, wherein the guide rail pillar 313 is configured to guide an actuation of the elevator cabin 102;
- a polycarbonate sheet 314 configured to cover the external cylinder assembly 310, wherein the polycarbonate sheet 314 and the external cylinder assembly 310 is coupled using a first locking device and a second locking device, wherein the first locking device is configured to lock an air gap between the polycarbonate sheet 314, the base ring assembly 311 and the external cylinder assembly 310 and the second locking device is configured to lock air gap between the polycarbonate sheet 314 and the guide rail pillar 313;
- a seal assembly 315 adapted to fit over a top portion of the elevator cabin 102, wherein the seal assembly 315 is configured to seal the elevator cabin 102 to reduce vibrations during upward and downward movement of the elevator cabin 102, wherein the seal assembly 315 comprises a depressurizing system configured to prevent the elevator cabin 102 from coming into force contact with the external cylinder assembly during upward movement and contribute to safety of an elevator operation;
- a first charger unit 20 mechanically coupled to an elevator column 30, wherein the first charger unit 20 is adapted to tap voltage from a power source, wherein the first charger unit 20 is interconnecting a first block 40 and a second block 50, wherein the first block 40 comprises at least two slots 60 adapted to interlock with at least two projections 70 provided on the second block 50; and
- a second charger unit 80 electrically coupled with the first charger unit 20 and mounted on a guide bracket 90 associated with a cabin of the elevator, wherein the second charger unit 80 comprises a plurality of pins 100 adapted to receive the voltage tapped by the first charger unit 20 to charge the energy storage unit associated with the elevator.

* * * * *